United States Patent
Espindola et al.

[11] Patent Number: 6,104,733
[45] Date of Patent: Aug. 15, 2000

[54] MULTI-STAGE OPTICAL FIBER AMPLIFIER HAVING HIGH CONVERSION EFFICIENCY

[75] Inventors: Rolando Patricio Espindola; Isaac Ryazansky, both of New Providence; Andrew John Stentz, Clinton; Kenneth Lee Walker, New Providence; Paul Francis Wysocki, Flemington, all of N.J.

[73] Assignee: Lucent Technologies Inc., Murray Hill, N.J.

[21] Appl. No.: 09/038,441

[22] Filed: Mar. 11, 1998

[51] Int. Cl.[7] .......................................................... H01S 3/10
[52] U.S. Cl. .................. 372/6; 372/75; 359/341; 385/27
[58] Field of Search ........................... 372/6, 32, 75; 359/341; 385/27–29, 31, 37, 39

[56] References Cited

U.S. PATENT DOCUMENTS

| | | | |
|---|---|---|---|
| 5,696,782 | 12/1997 | Harter et al. | 372/6 |
| 5,867,305 | 2/1999 | Waarts et al. | 372/6 |

*Primary Examiner*—Hemang Sanghavi
*Attorney, Agent, or Firm*—Eugen E. Pacher

[57] ABSTRACT

We have found that the conversion efficiency of a Er/Yb-doped cladding pumped fiber amplifier increases with increasing signal input power. Thus, preamplification of the input signal by means of an Er-doped fiber amplifier can result in increased conversion efficiency of the cladding pumped power amplifier. Such increased efficiency is desirable, lessening heat removal problems and/or facilitating increased reliability.

6 Claims, 2 Drawing Sheets

6,104,733

MULTI-STAGE OPTICAL FIBER AMPLIFIER HAVING HIGH CONVERSION EFFICIENCY

FIELD OF THE INVENTION

This invention pertains to multi-stage optical fiber amplifiers, and to articles (e.g., a communication system) that comprise such an amplifier.

BACKGROUND

As the aggregate data rates in optical fiber communication systems continue to increase, the required output powers from fiber optic amplifiers also increase. In addition, as fibers are installed to carry CATV video channels to the home, unprecedented power levels will be required to overcome the massive splitting losses and high power demands of analog communication systems. Remotely pumped communication systems also require high power fiber amplifiers. Current amplifiers are already pushing against the limits imposed by facet damage of conventional single-transverse-mode semiconductor pump lasers. Thus, it is necessary to develop fiber optic amplifiers that are capable of providing high output power.

A promising approach utilizes cladding-pumped (CP) Fiber amplifiers. In this type of amplifier, multi-transverse-mode pump light is injected into the inner cladding of a CP fiber while single-transverse-mode signal light is injected into the core of the fiber. The core of the CP fiber is typically doped with a rare-earth dopant that absorbs the pump light and then serves to amplify the signal. Often the rare-earth-doped core contains both erbium and ytterbium. The pump light (typically between 900–980 nm) is absorbed by the ytterbium ions which then transfer their excitation to the erbium ions. The excited erbium ions may then amplify a 1.5 $\mu$m signal. Various schemes can be used to achieve the required multimode/single mode coupling. See, for instance, U.S. Pat. No. 5,864,644 filed Jul. 31, 1997 by DiGiovanni and Stentz, incorporated herein by reference.

The efficient conversion of input pump power to output signal power is extremely important for a power amplifier. A power amplifier with low conversion efficiency will need to dissipate more heat from its pump diodes and thermo-electric coolers, from the amplifier fiber itself, and from the amplifier package on the whole. In addition, the reliability of pump diodes generally decrease with increasing output power. Therefore, the reliability of an amplifier is typically compromised by poor conversion efficiency. In view of these facts, it is evident that it is highly desirable to have available a fiber optic power amplifier having high conversion efficiency. This application discloses such an amplifier.

SUMMARY OF THE INVENTION

We have made the unexpected discovery that the conversion efficiency (the ratio of the output signal power to the input pump power) of an erbium/ytterbium (Er/Yb) CP fiber optic amplifier is strongly dependent on the input signal power, increasing with increasing input signal power. This unexpected feature can be used to provide a fiber optic power amplifier having high conversion efficiency, as will be described in detail below.

The invention is embodied in an article (e.g., a communication system, or a component of such a system) that comprises a fiber optic amplifier comprising a CP fiber amplifier. The CP amplifier comprises at least one pump laser (typically a semiconductor laser) adapted for providing pump radiation of wavelength $\lambda_p$, and a length of CP fiber having a first end and a second end. The CP fiber has an Er/Yb-doped core that is surrounded by an inner cladding and an outer cladding, with the inner and outer claddings selected such that the CP fiber is a multimode fiber at $\lambda_p$. The CP fiber amplifier further comprises a signal radiation coupler (possibly a conventional fiber splice) for coupling signal radiation into the core of the CP fiber at the first end of the length of CP fiber, and a pump radiation coupler for coupling at least a part of the pump radiation into the inner cladding of the CP fiber. During operation of the CP fiber amplifier, amplified signal radiation is provided from the second end of the length of CP fiber for utilization. The signal radiation coupler and the pump radiation coupler could be combined into a single coupler, but can also be separate components.

Significantly, the fiber optic amplifier further comprises a fiber optic preamplifier disposed upstream of the first end of the length of CP fiber, and disposed to receive signal radiation and to emit amplified signal radiation that is coupled into the first end of the CP fiber by the signal radiation coupler, whereby the optical fiber amplifier can attain high conversion efficiency, as compared to an otherwise identical fiber amplifier without preamplifier.

Those skilled in the art will know that a conventional erbium power amplifier can typically be driven heavily into saturation with an input signal power as low as −10 dBm, yielding a conversion efficiency of greater than 70% of the quantum efficiency.

On the other hand, we have found that an erbium/ytterbium (Er/Yb)-doped CP amplifier continues to show a substantial increase in the conversion efficiency even if the input signal power is increased above about 10 dBm, two orders of magnitude more input signal power than is necessary to achieve good conversion efficiency in a conventional Er power amplifier. This is a surprising result that is, to the best of our knowledge, not suggested by the prior art.

BRIEF DESCRIPTION OF THE DRAWINGS

The drawings are not to scale or in proportion. Same or equivalent features have the same reference numeral in different figures.

DETAILED DESCRIPTION OF AN EXEMPLARY EMBODIMENT

Figure 1:
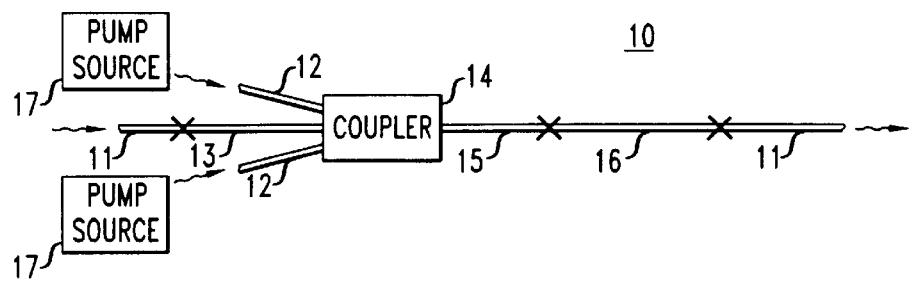
FIG. 1 schematically depicts a prior art CP fiber amplifier.

FIG. 1 schematically depicts a prior art cladding-pumped fiber amplifier 10, wherein numerals 11 refer to conventional single mode (typically for signal radiation of about 1.5 $\mu$m wavelength) transmission fiber. Numerals 12 refer to multimode (for pump radiation, exemplarily of approximate wavelength 0.9 $\mu$m) fibers. Only 2 multimode fibers are shown, although the number typically is greater, e.g., six. Numeral 13 refers to single mode (at the signal wavelength $\lambda_s$) fiber that is spliced to the upstream transmission fiber. Numerals 17 refer to semiconductor pump lasers, with the laser output of a given pump laser (comprising radiation of wavelength $\lambda_p$) of a given pump laser coupled into the corresponding multimode fiber.

Figure 3:
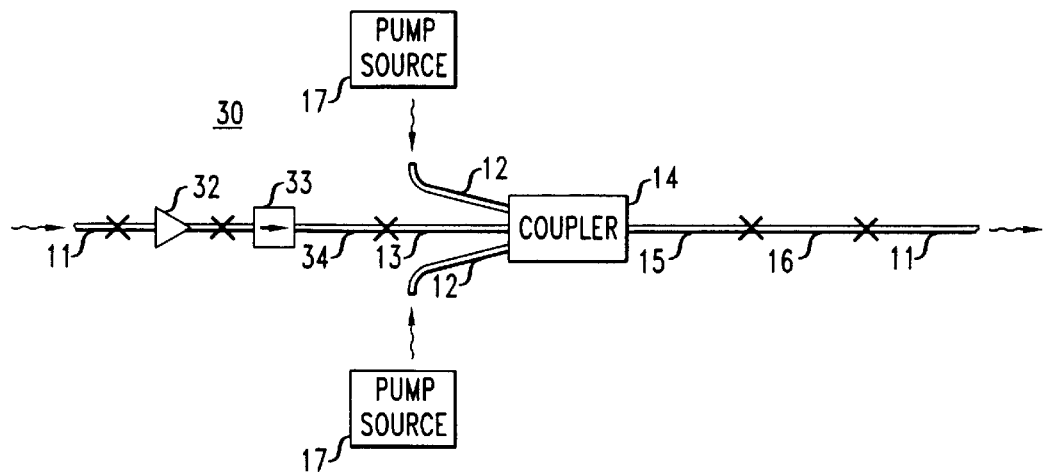
FIGS. 3 and 5 schematically show optical fiber amplifiers according to the invention.

Numeral 14 refers to a coupler that couples the signal radiation into the core of fiber 15, and couples the pump radiation into core and cladding of fiber 15. The coupler can take a variety of forms. Currently preferred is a tapered fiber bundle as described in the above referenced patent. Because the core of fiber 15 has much smaller cross section than the cladding, most of the pump radiation propagates in the cladding of the fiber. Numeral 16 refers to a length of cladding-pumped fiber, typically fusion spliced to coupler output fiber 15 and to downstream transmission fiber 11. Cladding-pumped fibers are known. Typically they are single mode at $\lambda_s$, with rare earth (e.g., Er and Yb)-doped core, the core surrounded by an inner cladding having lower refractive index than the core, and the inner cladding surrounded by an outer cladding (typically a polymer coating) of lower refractive index than the inner cladding, such that multimode pump radiation is guided by the fiber, and serves to excite the appropriate rare earth ions in the fiber core. The signal radiation is amplified in conventional manner by stimulated emission, with the amplified signal radiation transmitted into the downstream transmission fiber. In FIGS. 1 and 3, a splice is indicated by an "X" symbol, as is conventional, and some conventional components (e.g., an optional isolator) are not shown.

Figure 2:
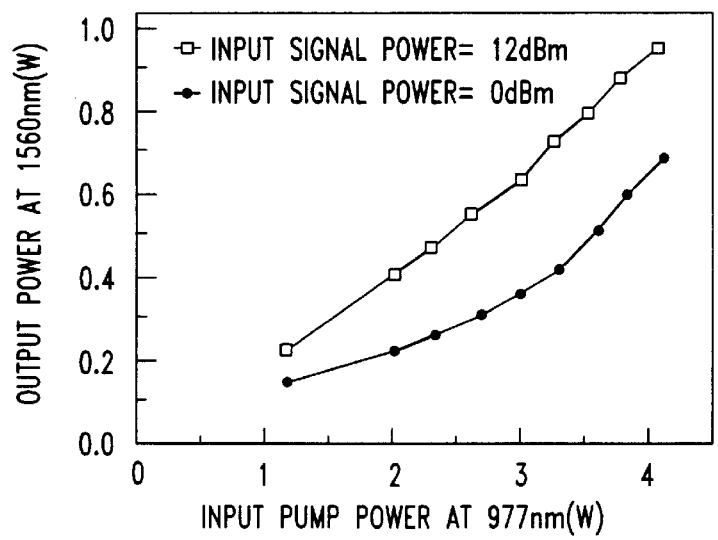
FIG. 2 shows exemplary data on signal output power vs. input pump power, as a function of input signal power.

FIG. 2 exemplifies our surprising discovery that the efficiency of an Er/Yb-doped cladding pumped laser strongly depends on the input signal power. The data were obtained with a tapered fiber bundle and a Er/Yb-doped CP fiber. The tapered fiber bundle contained six multimode, pump radiation-carrying fibers and one single-mode fiber. The Er/Yb CP fiber was 8 m in length, with a 125 $\mu$m diameter inner cladding. The total pump attenuation in the CP fiber was approximately 10 dB. The input signal ($\lambda_s$= 1560 nm) was directly generated by an external cavity semiconductor laser at an input power of 0 dBm. A conventional Er amplifier, pumped at 980 nm, was used as a preamplifier, to increase the signal input power to the CP fiber to 12 dBm. The arrangement is able to provide output signal power greater than 23 dBm, and the input signal power to the CP fiber desirably is greater than or equal to 10 dBm.

FIG. 2 shows, for instance, that increasing the input signal power from 0 dBm to 12 dBm (an increase of less than 16 mW) results in an increase in the signal output power ($\lambda_s$=1560 nm) by 335 mW, at input pump power ($\lambda_p$=977 nm) of 4.0 W. This corresponds to an overall increase in conversion efficiency from 17% to 25%, a significant improvement that can translate into a substantial increase in amplifier reliability and/or design simplification as well as savings in manufacturing costs.

We have not yet determined the physical basis underlying the observed effect, but the following is consistent with the results we have obtained to date. Increased signal power possibly lowers the inversion of the Er ions in the core of the cladding pumped fiber, thereby facilitating the energy transfer from the Yb to the Er ions, reducing the loss of energy to spontaneous emission from the Yb ions.

The above mechanism is proposed for tutorial reasons only, and the invention in no way depends on the correctness of the proposed mechanism.

The observed dependence of the conversion efficiency on the signal input power can be utilized to design an improved optical fiber amplifier. FIG. 3 schematically depicts such an amplifier 30.

In FIG. 3, numeral 32 refers to a conventional EDFA (Er-doped fiber amplifier), including an appropriate source of pump radiation (not shown), and coupling means (also not shown) for coupling the pump radiation into the amplifier fiber. Numeral 33 refers to an optional (but preferred) optical isolator that serves to prevent reflected radiation from reaching the EDFA, and 34 typically is a conventional single mode fiber. It will be understood that the EDFA 32 and isolator 33 can be combined into a single package. All features of FIG. 3 that are located downstream of the splice between fibers 34 and 13 can be the same as the equally numbered features of FIG. 1. Of course, due to the potentially much higher efficiency of the amplifier of FIG. 3, as compared to that of FIG. 1, the design details of the cladding-pumped amplifier of FIG. 3 typically will differ from those of the prior art amplifier 10. For instance, the former could have reduced-capacity cooling means as compared to the latter.

Figure 5:
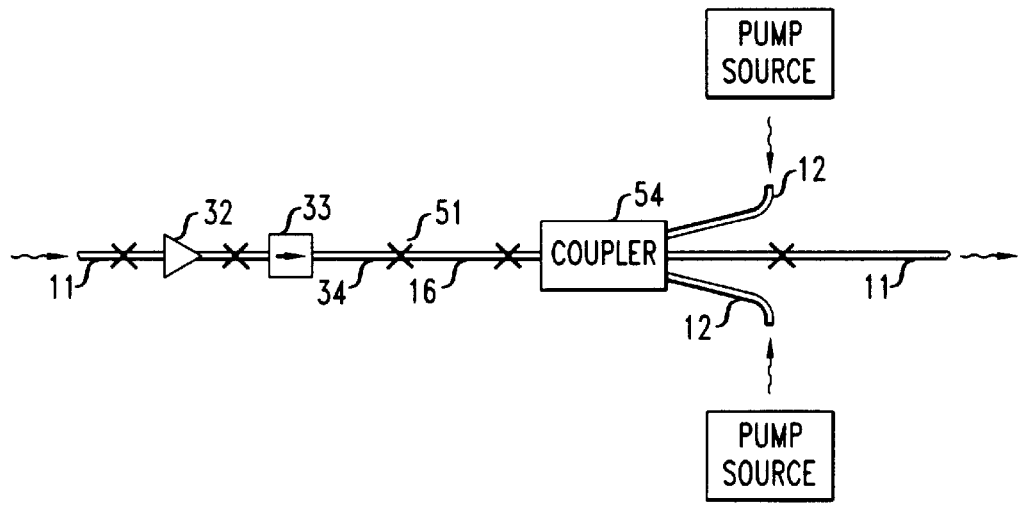

The arrangement of the components in the embodiment of FIG. 3 is exemplary only, and other arrangements are possible. For instance, the coupler 14 could be positioned downstream of CP fiber 16, such that the pump radiation counter-propagates with the signal radiation. Such a coupler typically would comprise a single mode fiber for coupling signal radiation out of the CP fiber. FIG. 5 schematically depicts an exemplary counterpumped embodiment of the invention, wherein the portion upstream of the coupler between fibers 34 and 13 is the same as in FIG. 3. Signal radiation coupler 51 is a conventional fiber splice. Pump radiation coupler 54 is located downstream of CP fiber 16 and serves to couple pump radiation into core and inner cladding of the CP fiber, as well as to receive amplified signal radiation from the CP fiber and to provide it to the downstream transmission fiber.

Figure 4:
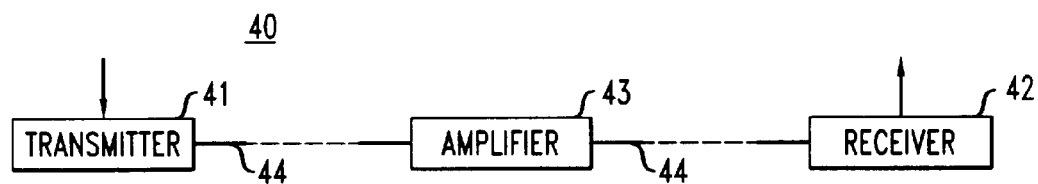
FIG. 4 schematically depicts an exemplary communication system according to the invention.

FIG. 4 schematically depicts an exemplary optical fiber communication system 40 according to the invention, wherein numerals 41 and 42 refer respectively to a conventional transmitter and a conventional receiver, and 43 refers to an optical amplifier, with a 2-stage amplifier according to the invention as pump source. Numerals 44 refer to conventional transmission fiber. The arrangement of FIG. 4 is exemplary only, and other arrangements are contemplated. For instance, the amplifier according to the invention could serve as pump source in a remotely pumped communication system. In this case the amplifier according to the invention typically is located at or near the transmitter or receiver, with the output of the amplifier being transmitted through conventional fiber 44 to a conventional amplifier between transmitter and receiver.

EXAMPLE

In an optical fiber amplifier according to the invention, the preamplifier was constructed with 20 m of conventional Er-doped fiber. The fiber was pumped with up to 80 mW of 980 nm light in a counterpropagating pump geometry. A conventional fused fiber coupler was used to couple the 980 nm pump light into the Er-doped fiber. The preamplifier comprised conventional input and output isolators. The power amplifier stage comprised 8 m of cladding pumped Er/Yb-doped fiber that had a nearly cylindrical silica inner cladding, approximately 125 $\mu$m in diameter. The CP fiber was coated with a low refractive index polymer that yielded a numerical aperture of 0.45. A multimode/single mode coupler of the type described in the '644 patent was used to couple the multimode pump light into the inner cladding of the CP fiber, while coupling the 1560 nm signal radiation into the single mode core. Six commercially available broad-area 977 nm semiconductor lasers were attached to the multimode single mode coupler, allowing injection of up to 4 W of pump power into the CP fiber. Measurements established that the conversion efficiency of the CP fiber amplifier increased with increasing signal output power of the Er-doped preamplifier.

The invention claimed is:

1. An article comprising a fiber optic telecommunication amplifier comprising a cladding-pumped fiber amplifier comprising:

a) at least one pump laser adapted for providing a continuous wave pump radiation of wavelength $\lambda_p$;

b) a length of cladding-pumped fiber having a Er/Yb-doped core, said core being surrounded by an inner cladding and an outer cladding, said inner and outer claddings selected such that the cladding pumped fiber is a multimode fiber at wavelength $\lambda_p$;

c) a signal radiation coupler for coupling a signal radiation into said core at a first end of the length of cladding-pumped fiber;

d) a pump radiation coupler for coupling at least a part of the continuous wave pump radiation into said inner cladding of the cladding-pumped fiber wherein;

e) the length of cladding-pumped fiber has a second end for providing signal radiation for utilization; and f) the fiber optic telecommunication amplifier further comprises a fiber optic Er-doped preamplifier disposed upstream of said first end of the length of cladding pumped fiber and disposed to receive said signal radiation and to emit amplified signal radiation that is coupled into the first end of the cladding-pumped fiber by the signal radiation coupler;

CHARACTERIZED IN THAT g) the fiber optic Er-doped preamplifier is selected to provide to the first end of the length of cladding pumped fiber amplifier an input signal power of more than 10 dBm, whereby the fiber optic telecommunication amplifier has a conversion efficiency of at least 25%, where "conversion efficiency" is the ratio of the output signal power to the input pump power.

2. Article according to claim 1, wherein the pump radiation coupler is selected to couple into the cladding-pumped fiber pump radiation that is co-propagating with the signal radiation.

3. Article according to claim 1, wherein the pump radiation coupler is selected to couple into the cladding-pumped fiber pump radiation that is counter-propagating with the signal radiation.

4. Article according to claim 1, wherein the fiber optic amplifier is selected to have an output signal power of more than 23 dBm.

5. Article according to claim 1, wherein the article is an optical fiber communication system comprising a transmitter, a receiver and an optical fiber transmission path that signal transmissively connects the transmitter and the receiver, said optical fiber communication system comprising said fiber optic telecommunication amplifier.

6. Article according to claim 1, wherein said at least one pump laser is a semiconductor pump laser.

* * * * *